United States Patent
Hazarika et al.

(10) Patent No.: US 10,593,325 B2
(45) Date of Patent: Mar. 17, 2020

(54) SYSTEM AND/OR METHOD FOR INTERACTIVE NATURAL SEMANTIC DIGITIZATION OF ENTERPRISE PROCESS MODELS

(71) Applicant: SOFTWARE AG, Darmstadt (DE)

(72) Inventors: Rinku Hazarika, Bangalore (IN); Jivtesh Singh Ahuja, Jalandhar (IN); Lakhya Jyoti Nath, Tezpur (IN); Rameshchandra Veeturi, Bangalore (IN)

(73) Assignee: SOFTWARE AG, Darmstadt (DE)

( * ) Notice: Subject to any disclaimer, the term of this patent is extended or adjusted under 35 U.S.C. 154(b) by 167 days.

(21) Appl. No.: 15/952,338

(22) Filed: Apr. 13, 2018

(65) Prior Publication Data

US 2019/0318730 A1    Oct. 17, 2019

(51) Int. Cl.
*G06F 17/00* (2019.01)
*G10L 15/19* (2013.01)
(Continued)

(52) U.S. Cl.
CPC ............ *G10L 15/19* (2013.01); *G06F 17/271* (2013.01); *G06F 17/274* (2013.01); *G06N 20/00* (2019.01);
(Continued)

(58) Field of Classification Search
CPC .... G06F 16/36; G06F 17/2785; G06F 16/367; G06F 16/24522; G06F 16/322;
(Continued)

(56) References Cited

U.S. PATENT DOCUMENTS 4,491,960 A   1/1985   Brown
5,251,268 A   10/1993  Colley et al.
(Continued)

OTHER PUBLICATIONS

Khoury et al., (2006) A Methodology for Extracting and Representing Actions in Texts, 2006 IEEE International Conference on Fuzzy Systems, Jul. 16-21, 2006.*
(Continued)

*Primary Examiner* — Edgar X Guerra-Erazo
(74) *Attorney, Agent, or Firm* — Nixon & Vanderhye PC

(57) ABSTRACT

Certain example embodiments relate to techniques for creating computerized models usable with enterprise modeling platforms implementing formalized modeling languages. Audio input of an orally-described model having semantic concepts associable with the formalized language but following a natural language pattern rather than an input pattern expected by the formalized language is received. At least some of the semantic concepts are recognizable from a domain-specific grammar that includes possible semantic concepts that are arranged hierarchically and associated with a domain to which the computerized model being created belongs. At least some others are recognizable from a general grammar that includes other possible semantic concepts that are relevant to the computerized model and that are arranged hierarchically but that are domain-independent. A digitized iteratively-reviewed version of the orally-described model is transformed into the computerized model via rules defining relationships between elements therein, and the formalized language.

20 Claims, 4 Drawing Sheets

(51) Int. Cl.
*G06Q 10/06* (2012.01)
*G06F 17/27* (2006.01)
*G10L 15/18* (2013.01)
*G10L 15/22* (2006.01)
*G06N 20/00* (2019.01)

(52) U.S. Cl.
CPC ........ *G06Q 10/067* (2013.01); *G10L 15/1815* (2013.01); *G10L 15/22* (2013.01)

(58) Field of Classification Search
CPC ............... G06F 16/951; G06F 17/2705; G06F 16/3344; G06F 16/9024; G06F 16/90335; G06F 16/904; G06F 17/271; G06F 17/274; G06F 17/5009; G06N 5/02; G06N 5/04; G06N 20/00; G06N 99/005; G10L 15/1815; G10L 15/19; G10L 15/22
See application file for complete search history.

(56) References Cited

U.S. PATENT DOCUMENTS

| | | | |
|---|---|---|---|
| 5,337,372 A | 8/1994 | Lecun et al. | |
| 5,729,630 A | 3/1998 | Ikeda | |
| 6,320,597 B1 | 11/2001 | Ieperen | |
| 7,171,056 B2 | 1/2007 | Zhang et al. | |
| 8,335,754 B2* | 12/2012 | Dawson | G06F 17/2705 706/45 |
| 9,047,561 B2* | 6/2015 | Heidasch | G06N 5/02 |
| 9,098,806 B2* | 8/2015 | Heidasch | G06N 5/02 |
| 9,558,467 B1 | 1/2017 | Simon et al. | |
| 10,002,159 B2* | 6/2018 | Kuriakose | G06F 16/24522 |
| 2010/0228693 A1* | 9/2010 | Dawson | G06F 17/2705 706/12 |
| 2013/0275344 A1* | 10/2013 | Heidasch | G06N 5/02 706/11 |
| 2013/0326048 A1* | 12/2013 | Heidasch | G06N 5/02 709/224 |
| 2014/0379755 A1* | 12/2014 | Kuriakose | G06F 16/24522 707/780 |
| 2015/0052085 A1* | 2/2015 | Heidasch | G06N 5/02 706/11 |

OTHER PUBLICATIONS

Casey Whitelaw, Navendu Garg, and Shlomo Argamon. (2005). Using appraisal groups for sentiment analysis. In Proceedings of the 14th ACM international conference on Information and knowledge management (CIKM '05). ACM, New York, NY, USA, 625-631.*
Wikipedia—OpenCV, retrieved Mar. 1, 2016, 4 pages. https://en.wikipedia.org/wiki/OpenCV.
OpenCV, retrieved Mar. 1, 2016, 1 page. http://opencv.org/.
Wikipedia—Tesseract (software), retrieved Mar. 1, 2016, 4 pages. https://en.wikipedia.org/wiki/Tesseract_%28software%29.
Post-it Plus App, retrieved Mar. 1, 2016, 6 pages. http://www.post-it.com/3M/en_US/post-it/ideas/plus-app/?WT.mc_id=www.post-it.com/app.
Simbio: Product-Portfolio, retrieved Mar. 2, 2016, 4 pages. http://www.symbioworld.com/en/product/product-portfolio.html.
Prabhu et al. "Whiteboard documentation through foreground object detection and stroke classification," Oct. 2008, IEEE, pp. 336-340.
NLTK 3.2.5 Documentation, "Natural Language Toolkit," retrieved Apr. 12, 2018, 2 pages. https://www.nltk.org/.

* cited by examiner

SYSTEM AND/OR METHOD FOR INTERACTIVE NATURAL SEMANTIC DIGITIZATION OF ENTERPRISE PROCESS MODELS

TECHNICAL FIELD

Certain example embodiments described herein relate to techniques for generating enterprise models. More particularly, certain example embodiments described herein relate to systems and/or methods that implement a user-interactive approach to transforming into a formalized computerized enterprise model usable with an enterprise modeling system spontaneous, unstructured and/or loosely-structured natural language content that is captured from an audio source and includes semantic concepts recognizable from a general model grammar and/or one or more extensible, hierarchically arrangeable domain-related grammars.

BACKGROUND AND SUMMARY

Enterprise modeling typically involves the building of a graphical diagram that describes and defines structures, processes, information, and/or resources of an organization. Such diagrams, also known as models, are graphical representations that generally are composed from a set of predefined symbols and connection types. Process models and data models are some of the most prominent types of enterprise models, although organizational charts, entity relationship diagrams, value added chain diagrams, function trees, value stream maps, and the like also are well-known and widely-used enterprise model types.

There are some commercially available software tools that support enterprise modeling. Some of these tools focus on business process modeling, while others have specialized in data modeling, IT planning, and/or the like. Currently, the most prevalent group of commercially available software tools may be classified as being Business Process Analysis (BPA)/Enterprise Architecture (EA) software tools. These tools typically offer a broad spectrum of functionalities, not only for modeling, but also for analyzing and publishing enterprise models. ARIS, MEGA, and Adonis are examples of BPA/EA tools.

Modeling activity usually starts with a group of people discussing the content and structure of the enterprise model. Despite some attempts to support such discussions with software (e.g., virtual meeting software and/or collaboration tools such as Skype, WebEx, etc.), many of these discussion occur in face-to-face meetings and workshops. The results of these face-to-face meetings and workshops typically are documented during the meeting via whiteboards, flipcharts, and/or the like. This manual process allows models to be developed quickly and interactively, without requiring users to struggle with technology.

At some point (e.g., once the group is satisfied with the result), the content created on the whiteboard or flipchart needs to be transferred into a modeling tool. This transference unfortunately is a tedious task that typically is performed in a fully manual fashion. There accordingly is a substantial "media break" as between the creation of content on the whiteboard or flipchart, and the creation of a corresponding model via a software tool. This media break unfortunately carries costs in that the manual transference process is error-prone, typically requires redundant review exercises, sometimes produces low-quality results (e.g., if there is a lack of understanding in what was created in the real world, how what was created in the real world relates to the computer modeling tool's capabilities, etc.). Thus, there unfortunately is a resource drain associated with this burdensome manual process.

Mobile computing in general allows computer technology to be brought into meeting situations, and modeling software to be used during discussions to capture results directly digitally. With a mobile computing approach, a model can be created in the software in a direct, digital manner, and can be refined and distributed therefrom after the meeting. Mobile computing therefore removes the media break discussed above. Unfortunately, it typically is difficult for groups to focus on the discussion and the results while dealing with modeling program software and associated hardware (e.g., laptop, projector, power line, etc.). Mobile computing solutions also typically allow only one person to provide input at a time (e.g., through a keyboard and/or mouse, etc.). Thus, the ability to accommodate multiple idea contributions in parallel may not be feasible or even possible in many cases. There also is a risk of becoming lost in technical details, as opposed to focusing on the actual subject. Directly using modeling software with a mobile computing device may also require technical people familiar with the "ins-and-outs" of software to be present and engaged.

The Symbio Workshop Scanner by Ploetz+Zeller GmbH is a piece of desktop software that takes a digital picture of a process model as an input, analyzes symbols and text, and creates an adequate process model in the Symbio modeling software. Process models created by static shapes on a whiteboard can be digitized automatically. Unfortunately, however, semantics of the modeling objects are determined solely by static shapes to be retrieved from the vendor. The technology is limited to the process flows that are sequences of activities, and there are no complementary model object types (e.g., roles, input, output, IT systems, etc.) possible. Text recognition tends to work well, but there is no machine learning included. On the whole, a classical top-to-bottom flow is very rigid and difficult to handle on classical whiteboards. Configuration possibilities are extremely limited.

U.S. Pat. No. 9,558,467 helps address the media break between whiteboards, flipcharts, and the like, and modeling software and computerized modeling systems. For instance, certain example embodiments of the '467 patent address the media discontinuity when models (e.g., business models) are designed on a whiteboard or other physical medium and later need to be stored electronically on a computer in a computerized and standardized modeling language format. Certain example embodiments of the '467 patent use a camera and a software application to identify certain graphical elements and text, and then transform the picture into the computerized model. A different modeling "language" may be used on the whiteboard, as compared to what is available on or via the computer. This transformation takes into account that an identical process can be described, advantageously, using a different grammar on a whiteboard than is applicable on a computer. For example, the complex connections between processing steps and also between roles of responsible people, as well as the input and output definitions, might be too complex to draw in the same way on the board as is shown on a computer screen. In this sense, certain example embodiments introduce a model type for a whiteboard, which offers certain advantages over the standard computer modeling, while allowing for a clearer processing by the photo-imaging software, e.g., to help uniquely identify each token as being grammatically and semantically correct.

Although the techniques of the '467 patent are advantageous compared to prior art approaches, the inventors of have recognized that further technical improvements are still possible. For example, although the '467 patent helps address the media discontinuity when models are designed on a whiteboard or other physical medium and later need to be stored electronically on a computer in a computerized and standardized modeling language format, certain example embodiments of this invention take into account the fact that there might not always be a physically-created model, whiteboard schematic, or the like. Certain example embodiments provide a solution that helps to solve the problems associated with this yet broader technical gap, reducing the manual burden involved in recognizing and transforming an orally-described and/or manually-sketched model on a whiteboard platform to a digitized model that fits within an enterprise modeling computer system.

One aspect of certain example embodiments relates to the ability to help bridge the gap between the spontaneous, unstructured and/or only loosely structured nature of more freely-flowing oral conversations, and modeling software and computerized modeling systems. For instance, certain example embodiments address the media discontinuity when models (e.g., business models) are described orally in brainstorming, planning, and/or other sessions, and then later need to store representations of such models electronically on computers in a computerized and standardized modeling language format. This approach is technically advantageous, as formalized models can be created quickly, accurately, and more directly, from the original idea phase at which they are presented, thereby bypassing the need for physical media, and physical media designed in accordance with a predefined format, while also reducing and potentially eliminating the need for an understanding of how specialized modeling software works, how models are to be formatted, etc.ki Another aspect of certain example embodiments relates to transforming conversations that often are free-flowing and lack a concrete relationship to a formalized input pattern, into a standardized modeling language format. This is aided through the use of extensible grammars in certain example embodiments. For instance, in certain example embodiments, semantic concepts in the free-flowing oral conversation are recognized in connection with a general grammar that includes possible semantic concepts that are relevant to the computerized model and that are arranged hierarchically but that are domain-independent, and/or one or more domain-related grammars that include possible semantic concepts that are arranged hierarchically and associated with a domain to which the computerized model being created belongs and/or. The use of a "general" grammar is technically advantageous in that, among other things, it provides for a basic level of interoperability, regardless of what type of model is being created, the domain(s) to which the model belong(s), etc. The general grammar also is technically advantageous in that it allows for different model concepts to be "hot swapped" into the model-generating platform, e.g., thereby enabling different semantic concepts specific to different modeling languages to be understandable, even as modeling languages are defined or refined to include new and/or modified concepts, to deal with deprecated concepts, etc. The use of one or more domain-related grammars is technically advantageous because they enable the quality of the recognition to be more accurate and precise, e.g., by cataloging the terms most likely to be of relevance in a particular area, to provide disambiguation between general model and domain-specific concepts, as well as between different domain-specific concepts and concepts that might have different meanings depending on the domain, etc.

Domain-related grammars also are technically advantageous because they allow the model-generating platform to be made more generic, e.g., such that the same platform can be used to create models for drastically different industries and/or technologies, to recognize objects of potentially very different physical and/or virtual types, etc. Domain-specific grammars may also enable linkages to a wide variety of different physical elements (e.g., computer hardware in an online order processing system, robots used in creating a vehicle, sensors applied to homes, etc.) relevant for the model's deployment. The separation of domain-related and general model-related grammars thus is technically advantageous in terms of further enhancing the flexibility and extensibility of the platform. Moreover, although voice recognition technology and natural language processing are inherently technical in nature, the use of different grammars in the ways described herein further improve on these underlying technologies, e.g., by facilitating a baseline level of interoperability regardless of domain, deployment system, physical elements to be manipulated post-deployment, etc., while also enabling much higher quality and much more precise recognitions to be made through the use of hierarchical and extensible domain-related grammars—which in turn advantageously leads to much more accurate and precise model creation. There is a synergistic technical effect in this sense, as the general model grammar can be highly specialized for model creation, while the domain-related grammars can be highly specialized for specific industries, technology areas, etc.

Another aspect of certain example embodiments relates to a multi-stepped or multi-phase transformation where the objects, object types, connections, aurally recognized text, etc., can be manually corrected. This multi-pass approach advantageously aids in providing for smoother conversions from natural language audio to the formalized modeling language.

Still another aspect of certain example embodiments relates to an approach for potentially obviating the need to use different modeling languages and a transformation process between two different media (e.g., computer and computer, audio and computer, etc.), in order to compensate for the media break between the original natural language description of the model and the formalized representation.

Advantageously, the suggested language and the transformation may be flexible and adjustable for different requirements of the modeling, as well as for the computer model engine. For example, using a multi-step transformation advantageously allows for a transparent way of adjusting the (sometimes very coarse) output from automatic audio recognition and digital audio processing hardware and/or software, e.g., for nuanced connections, symbols, and text recognition, etc.

In certain example embodiments, a system for creating a computerized model usable in connection with an enterprise modeling platform is provided. The computerized model is defined in connection with a formalized modeling language. The system includes an audio input interface and a display device, as well as processing resources including at least one processor and a memory operably coupled thereto. The processing resources are configured to control the system to at least receive, over the audio input interface, audio input of an orally-described model from which the computerized model is to be created. The orally-described model has semantic concepts associable with the formalized modeling language but following a natural language pattern rather than an input pattern expected by the formalized modeling language. The semantic concepts included in the orally-described model are recognized, with the recognizing including a plurality of different identification levels, and with the different identification levels respectively corresponding to recognitions of semantic concepts in the orally-described model including (a) objects for inclusion in the computerized model, (b) object types for the recognized objects, and (c) connections between at least some of the recognized objects. At least some of the semantic concepts are recognizable from a domain-specific grammar that includes possible semantic concepts that are arranged hierarchically and associated with a domain to which the computerized model being created belongs, and at least some others of the semantic concepts are recognizable from a general grammar that includes other possible semantic concepts that are relevant to the computerized model and that are arranged hierarchically but that are domain-independent. A digitized iteratively-reviewed version of the orally-described model is generated by: presenting, on the display device and on an identification level by identification level basis, results of the recognitions corresponding to at least some of the respective identification levels; and accepting user modification(s) to the results on the identification level by identification level basis. The digitized iteratively-reviewed version of the orally-described model is transformed into the computerized model in accordance with a set of rules defining relationships between elements in the digitized iteratively-reviewed version of the orally-described model and the formalized modeling language.

In certain example embodiments, a system for creating a computerized model usable in connection with an enterprise modeling platform is provided. The computerized model is defined in connection with a formalized modeling language. The system includes an audio input interface and a display device. A domain-specific grammar store includes possible semantic concepts that are arranged hierarchically and associated with a domain to which the computerized model being created belongs. A model grammar store includes other possible semantic concepts that are relevant to the computerized model, are arranged hierarchically, and are domain-independent. Processing resources including at least one processor and a memory operably coupled thereto are configured to control the system to at least: receive, over the audio input interface, audio input of an orally-described model from which the computerized model is to be created, the orally-described model having semantic concepts associable with the formalized modeling language but following a natural language pattern rather than an input pattern expected by the formalized modeling language; split the audio input into discrete sentences; identify and tag each word in each discrete sentence with a part of speech corresponding to the way in which it is used in the natural language pattern that the orally-described model follows; for each discrete sentence, and based on the tags, grouping together syntactically correlated words into one or more phrases (e.g., with the grouping involving at least two different phases, at least one of the phases being a positive filter for grouping together different words and at least one other of the phases being a negative filter for discarding words, and possibly in which a first phase is chunking and a second phase is chinking, e.g., with the first and second phases being performed in this order or a reversed order); separate each discrete sentence into one or more meaningful parts (e.g., based on one of a conjunction, subordinating conjunction, and adverb, being present in the respective discrete sentence); identify as context-relevant each meaningful part that includes (a) a phrase and/or (b) a word that is not a part of a phrase, that correspond(s) to a semantic concept found in the domain-specific grammar store and/or the model grammar store; for each identified context-relevant meaningful part, create a candidate object for inclusion in the computerized model, each created candidate object having associated therewith system-derived properties including a proposed order, proposed name, and proposed type; facilitate interactive step-wise user review by displaying, receiving user confirmation of, and enabling user modification(s) to, results generated responsive to one or more of: the splitting of the audio input into the discrete sentences, the separation of each discrete sentence into the one or more meaningful parts, the identification of each context-relevant meaningful part, the creation of each candidate object, and identification of the system-derived properties; generate a digitized iteratively-reviewed version of the orally-described model by presenting, on the display device, the created candidate objects together with indicia of their respective proposed names and proposed types, the created candidate objects being arranged in accordance with their proposed orders, and accepting user modification(s) to the presentation; and transform the digitized iteratively-reviewed version of the orally-described model into the computerized model in accordance with a set of rules defining relationships between elements in the digitized iteratively-reviewed version of the orally-described model and the formalized modeling language.

According to certain example embodiments, the processing resources may be further configured to control the system to at least (e.g., as a part of the recognizing): split the audio input into discrete sentences; identify and tag each word in each discrete sentence with a part of speech corresponding to a way in which it is used in the natural language pattern that the orally-described model follows; for each discrete sentence, and based on the tags, group together syntactically correlated words into one or more phrases; separate each discrete sentence into one or more meaningful parts; identify as context-relevant each meaningful part that includes (a) a phrase and/or (b) a word that is not a part of a phrase, that correspond(s) to a semantic concept found in the domain-specific grammar and/or the general grammar; and for each identified context-relevant meaningful part, create a candidate object for inclusion in the computerized model, each created candidate object having associated therewith system-derived properties including a proposed order, proposed name, and proposed type. The created candidate objects may be user-reviewable in connection with the generation of the digitized iteratively-reviewed version of the orally-described model.

According to certain example embodiments, the grouping may involve at least two different phases, e.g., with at least one of the phases involving implementation of a positive filter for grouping together different words and at least one other of the phases involving implementation of a negative filter for discarding words. In this sense, a first phase may be chunking and a second phase may be chinking, with the first and second phases possibly being performed in this order.

According to certain example embodiments, the processing resources may be configured to control the system to at least facilitate interactive step-wise user review by displaying, receiving user confirmation of, and enabling user modification(s) to, results generated responsive to one or more of: the splitting of the audio input into the discrete sentences, the separation of each discrete sentence into the one or more meaningful parts, the identification of each context-relevant meaningful part, the creation of each candidate object, and identification of the system-derived properties.

According to certain example embodiments, the identification levels may further include results generated responsive to the splitting of the audio input into the discrete sentences, the separation of each discrete sentence into the one or more meaningful parts, the identification of each context-relevant meaningful part, the creation of each candidate object, and identification of the system-derived properties.

According to certain example embodiments, the processing resources may be configured to control the system to at least deploy the computerized model, once transformed from the digitized iteratively-reviewed version of the orally-described model, to the enterprise modeling platform. In this regard, in certain example embodiments, the deployment may be performed to cause physical elements of a real-world analog of the computerized model to behave differently compared to a pre-deployment scenario, to cause computer-based resources of a real-world analog of the computerized model to interact with each other differently compared to a pre-deployment scenario, etc.

In addition to the features of the previous paragraphs, counterpart methods, non-transitory computer readable storage media tangibly storing instructions for performing such methods, executable computer programs, and the like, are contemplated herein, as well.

These features, aspects, advantages, and example embodiments may be used separately and/or applied in various combinations to achieve yet further embodiments of this invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages may be better and more completely understood by reference to the following detailed description of exemplary illustrative embodiments in conjunction with the drawings, of which.

DETAILED DESCRIPTION

Figure 1:
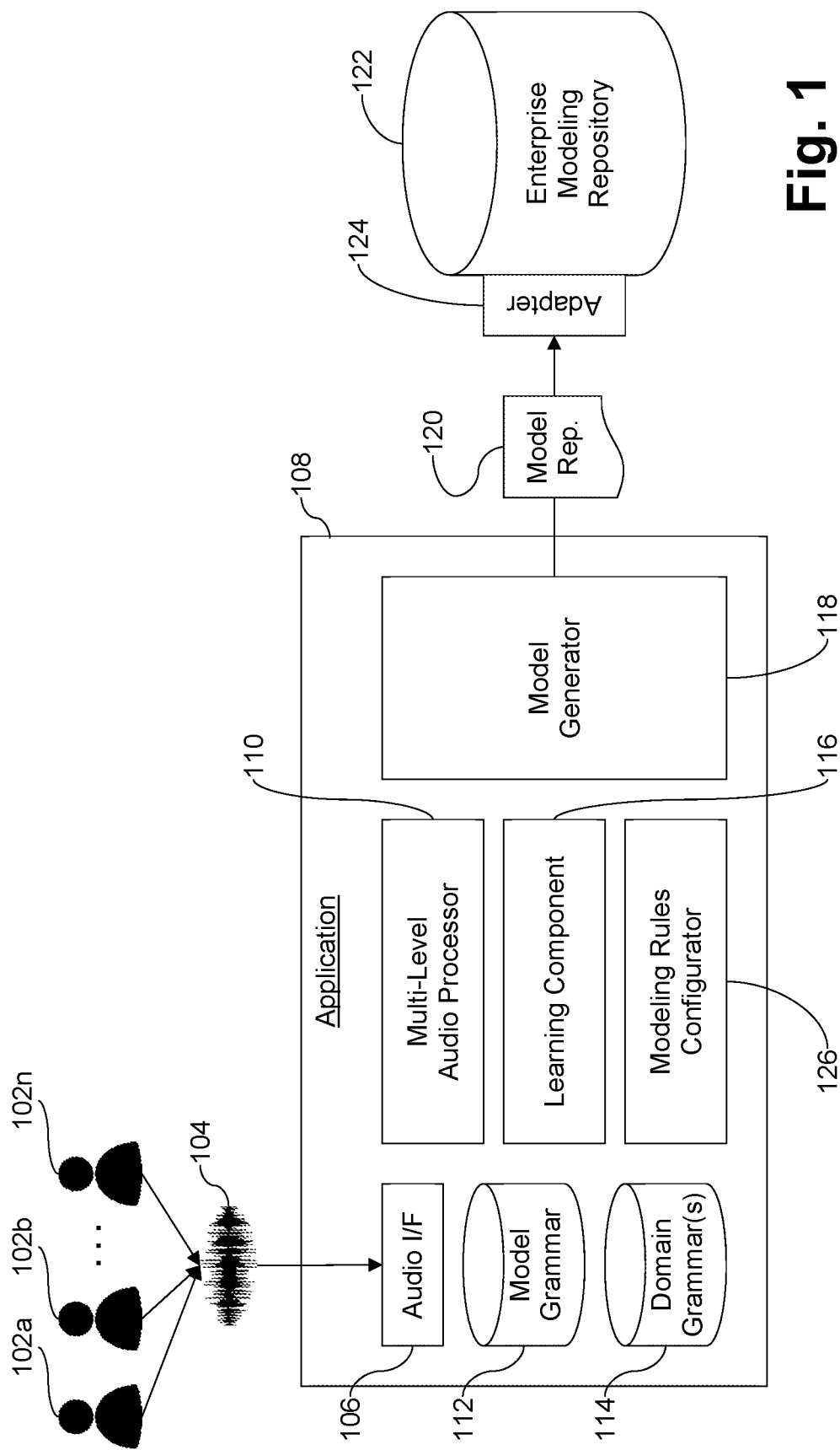
FIG. 1 is a block diagram showing example components of a system that may be used to convert an oral description provided in natural language into an enterprise model represented in a formalized modeling language, in accordance with certain example embodiments.

Certain example embodiments described herein relate to techniques for generating enterprise models. More particularly, certain example embodiments described herein relate to systems and/or methods that implement a user-interactive approach to transforming into a formalized computerized enterprise model usable with an enterprise modeling system spontaneous, unstructured and/or loosely-structured natural language content that is captured from an audio source and includes semantic concepts recognizable from a general model grammar and/or one or more extensible, hierarchically arrangeable domain-related grammars. As will be appreciated from the description below, certain example embodiments combine audio capturing, natural language input processing, smart filtering and parsing, and multi-level interactive semantic concept recognition technologies, together with general and domain-related grammar definitions, in these and related regards.

One strength of enterprise modeling is the information richness that is in essence encoded into well-structured formal or semi-formal graphical diagrams, making the information easy to grasp and processable by software. Defining the scope and the details of this information (e.g., details concerning process steps, rules, data, IT systems, organizational units, etc.) is one common objective of work sessions in which different stakeholders meet and collaboratively develop their ideas of the enterprise model. Free-handed sketching of an enterprise model on a whiteboard, flipchart, or the like is a commonly used technique that meets the immediate desire to document the results of the discussion in a simply and low-barrier way. Yet free-hand sketches bring with them some problems, e.g., when it comes to further processing the results after the session. The vagueness that may accompany an unstructured sketch can make automated digitization, and/or manual transference, of such drawings into an enterprise model an extremely difficult and error-prone task.

Of course, these problems can be magnified when no physical artifacts are created from such work sessions. Such work sessions may be recorded (e.g., via a conferring and/or collaboration system), but the same vagueness as noted above typically is even more pronounced. The process of listening to audio and trying to manually develop a model is complicated by this vagueness, together with the tediousness of that approach. Moreover, the person or persons creating the process from the recorded audio may lack the contextual understanding to pick up on nuances, and/or may lack the technical acumen needed to create a formalized model in a modeling language. Simply generating text from pre-recorded audio will not solve these issues. Indeed, having text that amounts to a transcript can be just as tedious to go through, and the accuracy of such text may not be good because the computer systems generating them, just like the individuals, may lack domain-related contextual and/or technical understandings relevant to the input and output.

Certain example embodiments help reduce the vagueness present involved in the audio capturing and digitization process in order to prepare the grounds for better results during model creation. Certain example embodiments adopt several technical approaches in this regard. For example, as will become clearer from the detailed description that follows, using a general model grammar and one or more domain-relevant grammars when performing the recognition of text, semantic concepts, and ways in which semantic concepts may interrelate, etc., helps provide for better input and progressively reviewed intermediate operations for converting unstructured or loosely structured natural language input patterns into patterns that are more analogous and well-structured, thereby further facilitating automated digitization.

Example Grammar-Related Techniques

Semantic concepts in general may include process steps, ideas, decisions, process problems/missing standards, lead time, process time, roles, etc. Semantic detail may include designation of input, output, software and/or other information technology systems utilized in the process being modeled or process step, etc. For example, the model grammar can assist in defining semantics common to model objects, model object relationships, etc. Model concepts such as tasks, relationships, associations, etc., can be defined on a general level in this way. Further domain-related context can be added via the one or more domain-related grammars, e.g., indicating likely candidates for object names, object types, object properties associated with different object types, etc. For instance, in a glass manufacturing plant, one might expect to have objects associated with a constituent elements, a furnace, a tin bath, etc. Amounts in ppm, temperature, level, etc., may be properties associated with these objects. Relationships would involve feeding, melting, floating, etc., respectively. These semantic concepts would be expected in a related grammar. But while they may be appropriate for a glass manufacturing related grammar, such concepts would not be expected for an automotive manufacturing line, a product shipping and/or logistics operation, etc. The accuracy of detection can be improved by taking into account these custom grammars (e.g., "melt" would be less likely to be recognized as "belt" in generating a glass making model, even though belt might be quite relevant to automotive manufacturing models).

Entries in a grammars can be arranged hierarchically in certain example embodiments. Keeping with the glass example, a taxonomy may be employed such that glass includes annealed, heat treated, chemically treated, etc., and heat treated may include heat strengthened and thermally tempered, etc. Glass may be further qualified as electronic grade, ballistic grade, commercial, residential, etc., thereby demonstrating multiple properties associated with one object.

Entire grammars may be used together and/or arranged hierarchically in certain example embodiments. For example, it may be the case that an end-to-end provider may form glass, coat it, build it into windows, and ship those windows for installation. Grammars thus may involve glass formation, glass coating, fabrication, and logistics. The use of multiple grammars may be advantageous for such end-to-end operations, and the grammars may be selectively referenced at different points (e.g., based on detected transitions in the audio input) to become active. In other instances, hierarchical grammars may be used to implicate heavy manufacturing, glass manufacturing, end-to-end fabrication, etc., to hone in on an appropriate set of grammars for use. Hierarchical grammars may be consulted in a predetermined order, e.g., from most-granular to least-granular, most domain specific to least domain specific, etc. Although the grammars may be hierarchical in certain example embodiments, only one grammar may be provided in some instances. Moreover, grammars may be considered hierarchical, e.g., as between one domain-specific or domain-related grammar, and one more general model grammar.

The grammars may include program logic, references to program logic, or other control codes mapping the semantic concepts to the formalized language expected by the grammar. For instance, rules specifying that output is to be in XML in a predefined format, e.g., with different tags representing different concepts, may be known in advance and saved to the grammars. This may aid in the automatic transformation of the "cleaned" orally-described model into the formalized model to be deployed.

Given a well-formed collection of potential semantic concepts via grammars, a group can develop a model collaboratively, and the model-generating system can have an easier time understanding and processing its input. This eases the burden of the media break between an "analog" enterprise model described orally, and a digital enterprise model in software. At the same time, the free-flowing nature of natural language conversations is still possible in the basic working session.

Example Multi-Level, Interactive Audio Recognition Techniques

The automated process of transferring audio into an enterprise model is broken down into multiple, interactive steps. This multi-step procedure allows for corrections to be made early, and for the general quality of the generated digital model to be improved.

A first step involves overall audio processing. In this first step, the audio is processed to create a text representation. Speech-to-text software libraries are known and can be used in this regard. The user may be shown output corresponding to the generated. Here, the user may see whether all information has been grasped by the processor, at least at a basic level. If not, the user may need to check the audio capture, source file, and/or the like, e.g., to ensure that there is sufficient audio volume, quality, etc.

A second step involves recognition of structures in the generated text. This may include, for example, the identification of sentences, semantically meaningful words and/or phrases (e.g., portions of sentences), etc. Additionally, or alternatively, it may involve presentation to the user of tags applied to sentences, words, and/or phrases. Such tags may be coarse (e.g., meaningful/not meaningful sentence, phase, word, etc.) and/or fine-grained (e.g., part of speech, expected context relevance, etc.)

Additional steps are provided for object recognition, object type inference and/or recognition, connection inference and/or recognition, etc. In these steps, words and/or phrases are recognized as candidate objects, e.g., using the techniques set forth below. Those objects and their derived object types are presented to the user. The user may review the types and correct them, if necessary.

The user is presented with the opportunity to review the results and edit the names, if necessary. By correcting mistakes, the user teaches the mechanism, which may learn for subsequent text recognition tasks. Relationship recognition may involve recognition of implicit and/or explicit relationships. For instance, each object may be analyzed for explicit relationships (described orally) and for implicit relationships (expressed by proximity to other objects, etc.) to other objects. All relationships are listed and may be reviewed and/or corrected on a per-object basis.

Example Use of Mobile Technology

Certain example embodiments may include a software application such as, for example, an application that runs on a computer, laptop, smartphone, tablet, and/or the like. The fact that most contemporary electronic devices are equipped with an integrated microphone facilitates integrating audio capturing and/or audio processing functionality in such devices, for example. Thus, most of the interactive work can be done on-site and in real time. Moreover, if a video conferencing or collaboration system such as Skype, WebEx, or the like is used, the computer or other device enabling a session may be used to perform the audio analysis, e.g., as the audio is received in real time. In certain example embodiments, pre-recorded content may be processed by such devices.

With audio captured by the user using an electronic device and in the absence of specialized hardware (such as, for example, a high-quality microphone), certain example embodiments may include robust processing resources, e.g., to work with potentially low-quality audio recordings. Some or all of the following and/or other issues may be considered: audio quality based on sampling rate, volume, compression level, etc.; implementation for different platforms, such as iOS and Android operation systems; implementation for different collaboration and/or conferencing tool used; and/or the like.

Example Implementation

Details concerning an example implementation are provided below. It will be appreciated that this example implementation is provided to help demonstrate the concepts of certain example embodiments, and aspects thereof are non-limiting in nature unless specifically claimed. For example, descriptions concerning specific code snippets, tags, the use of mobile devices and apps, the use of specific conventions, mapping rules, etc., are non-limiting in nature unless specifically claimed.

In certain example embodiments, the device performing the digitization (which may be a mobile device in some instances) may be used to automatically transfer orally-described models into a computerized enterprise modeling platform. For example, certain example embodiments use the ARIS process model.

In certain example embodiments, the set of predefined grammars and rules for transforming recognized text into the formal modeling language may be adaptable, e.g., to update the sets or create new sets. In this regard, certain example embodiments may include a configuration module or component that allows users to configure the grammars, transformation rules, e.g., via a user interface or wizard and without any specific coding or compilation requirements. The application may in some instances offer a predefined set of roles typically used for process modeling, data modeling, organizational charting, etc., which can be adapted. The users may adapt all aspects of the rules.

The following table lists the different types of connections that may be used in certain example embodiments. As will be appreciated from the table below, the connections differ in their semantics and, thus, they may differ in the way that they are represented in the audio and/or in the formalized language. Explicit connections may be mentioned explicitly (e.g., spoken and identified as such). Implicit connections may be mentioned or inferred, e.g., when objects are discussed in the same sentence, etc. Proximity connections may be inferred when different objects are discussed in adjacent sentences, for example. Thus, the following table helps provide an example of how the transformation from the recognized objects and relationships into a well-defined computerized model can be performed. For example, the transformation may be between the natural language and ARIS (connection) types in certain example embodiments, with or without intermediary processing. As above, these rules may be adaptable, e.g., depending on the computerized modeling system, and using the component or module mentioned above. Although the following table provides information related to ARIS, it will be appreciated that other modeling tools and/or languages may be used as the target of the transformation. Thus, the detail in the example table is representative of some types of objects, representations, types, etc., but other mappings may be used in different example embodiments.

| Source Type | Target Type | Connection Representation Type | Connection Type | Cxn Type in the Computer-Supported Solution (Enterprise Modeling Tool) |
| --- | --- | --- | --- | --- |
| PROCESS STEP | PROCESS STEP | Explicit or Implicit | is predecessor of | CT_IS_PREDEC_OF_1 (118) |
| PROCESS STEP | DECISION | Explicit or Implicit | leads to | CT_LEADS_TO_1 (116) |
| DECISION | PROCESS STEP | Explicit or Implicit | activates | CT_ACTIV_1 (43) |
| PROCESS ROLE | PROCESS STEP | Implicit by lane/column gridding | carries out | CT_EXEC_1 (65) |
| PROCESS PROBLEM | PROCESS STEP | Proximity | refers to | CT_REFS_TO_2 (728) |
| INPUT | PROCESS STEP | Implicit | is input for | CT_IS_INP_FOR (49) |
| PROCESS STEP | OUTPUT | Implicit | has as output | CT_HAS_OUT (50) |
| SYSTEM | PROCESS STEP | Implicit | supports | CT_CAN_SUPP_1 (221) |

FIG. 1 is a block diagram showing example components of a system that may be used to convert an oral description provided in natural language into an enterprise model represented in a formalized modeling language, in accordance with certain example embodiments. The users 102a-102n orally describe an enterprise model, e.g., as a part of a meeting, planning session, or the like. The users 102a-102n may be collocated in a conference room, participants in a meeting via an online collaboration tool dialed-in to a telephone conference, etc. The meeting does not necessarily adhere to a predefined and agreed-upon convention for who speaks and how sentences are formatted and instead follows more of a natural language pattern. For instance, formal conventions that govern who speaks, how they speak, what stop words or the like are used to signify model structures, etc., that might otherwise be easily understandable and easily convertible into a modeling language are not used. Instead, the natural language containing audio 104 is received by the audio interface 106 of the model-generating application 108. It will be appreciated that the audio interface 106 may receive audio in real time and/or from a prerecorded session (e.g., from a way or mp3 file, from a telephone conference or WebEx playback, etc.). The audio interface 106 interacts with the multi-level audio processor 110 component of the application 108.

The audio interface 106 typically is provided to computing devices and may include, for example, a port accommodating a microphone connection, software for processing analog and/or digital input, and/or the like. The users 102a-102n provide the audio 104, which is handed over to the multi-level audio processor 110.

The multi-level audio processor 110 takes the audio input 104 from the audio interface 106 as an input and analyzes it in multiple steps. As alluded to above, and as explained in greater detail below, it may offer interim results to the users 102a-102n and/or another authorized user using the application 108 "offline," e.g., for reviewing, editing, and/or other purposes. It also may provide input for continuous machine learning (e.g., in connection with the machine learning component 116). The model grammar 112 and/or domain grammar(s) 114 may aid the multi-level audio processor 110 in its analysis.

Data recognized by the multi-level audio processor 110, once reviewed, is consolidated into a structured exchange format file 120 (e.g., a JSON, XML, or other file format) that represents the final model representation in a formalized language. The users 102a-102n may choose a target model from the enterprise modeling repository 122 or decide to create a new model. The file 120 is then transmitted from the model generator and transmitter component 118, which facilitates these operations and works with a transceiver of the underlying device, to an adapter 124 of the repository 122. The adapter 124 may be configured to receive information over a wireless or wired network (such as, for example, the Internet). It may operate using APIs, web service calls, and/or the like.

The enterprise modeling repository 122 receives the structured file 120 through its adapter 124. The received enterprise model structures and objects are compared against the target model, which is updated accordingly. If there is no target model selected, the file 120 data is transformed into a new enterprise model. The updated or new target model is stored to the repository 122, which may be backed by non-transitory computer readable storage medium on a computing platform including processing resources comprising at least one processor and a memory.

The learning component 116 takes the feedback from the users 102a-102n and the multi-level audio processor 110 during the interactive audio processing and adapts its recognition rules accordingly, e.g., based on a machine-learning technique.

The modeling rules configurator 126 is a configuration unit that allows the user upfront to adapt the modeling rules (e.g., specifying, for example, the grammars, transformation rules, etc.), which are taken as a basis for the audio recognition and operations performed using the multi-level audio processor 110.

It will be appreciated that any suitable number of users 102a-102n may participate in the various operations described in connection with FIG. 1. For example, in some instances, multiple users may be involved in meeting and be able to provide input, only one user may be responsible for chairing the meeting and/or defining the mode, one user may interact directly with the multi-level audio processor 110 alone or with verbal or direct physical input from one or more other users, etc.

It also will be appreciated that the application 108 may be hosted on one or more different computer systems. The computer system(s) may include respective processing resources such as, for example, at least one processor and a memory operably coupled thereto. In certain example embodiments, the application may be a mobile application. A microphone may be in-built or connected thereto, and/or the audio 104 may be received in some other way (e.g., as a file download after being at least temporarily stored to and retrieved from a memory card of smart device; from a Skype, WebEx, telephone or other conference playback; etc.). In certain example embodiments, the application 108 and all of the components shown therein in the FIG. 1 example may be hosted by a mobile device such as, for example, a smartphone, tablet, or the like. A mobile device may include an in-built microphone. In other cases, the application 108 and all of the components shown therein in the FIG. 1 example may be hosted by a personal computer (PC) or the like. A PC may include an in-built microphone or have a microphone connected thereto.

In certain example embodiments, some or all of the functionality of the components shown in the application 108 may be performed locally. For example, audio may be captured locally in connection with the audio interface 106 but digitally processed in connection with the multi-level audio processor 110 at least remote from the device backing the application 108. For example, speech-to-text recognition may be performed remotely based on web service, API, or other calls from the device hosting the application 108. User input received at the device hosting the application 108 may provide input to such calls (e.g., confirming object detection, refining semantic object recognition, etc.). In certain example embodiments, some or all of the functionality of the components shown in the application 108 may be realized by having software modules configured to perform the functions described herein. Those software modules may be a part of the application 108, and they may be stored in a memory of the device backing the application 108 and executable using the device's processing resources.

Figure 2:
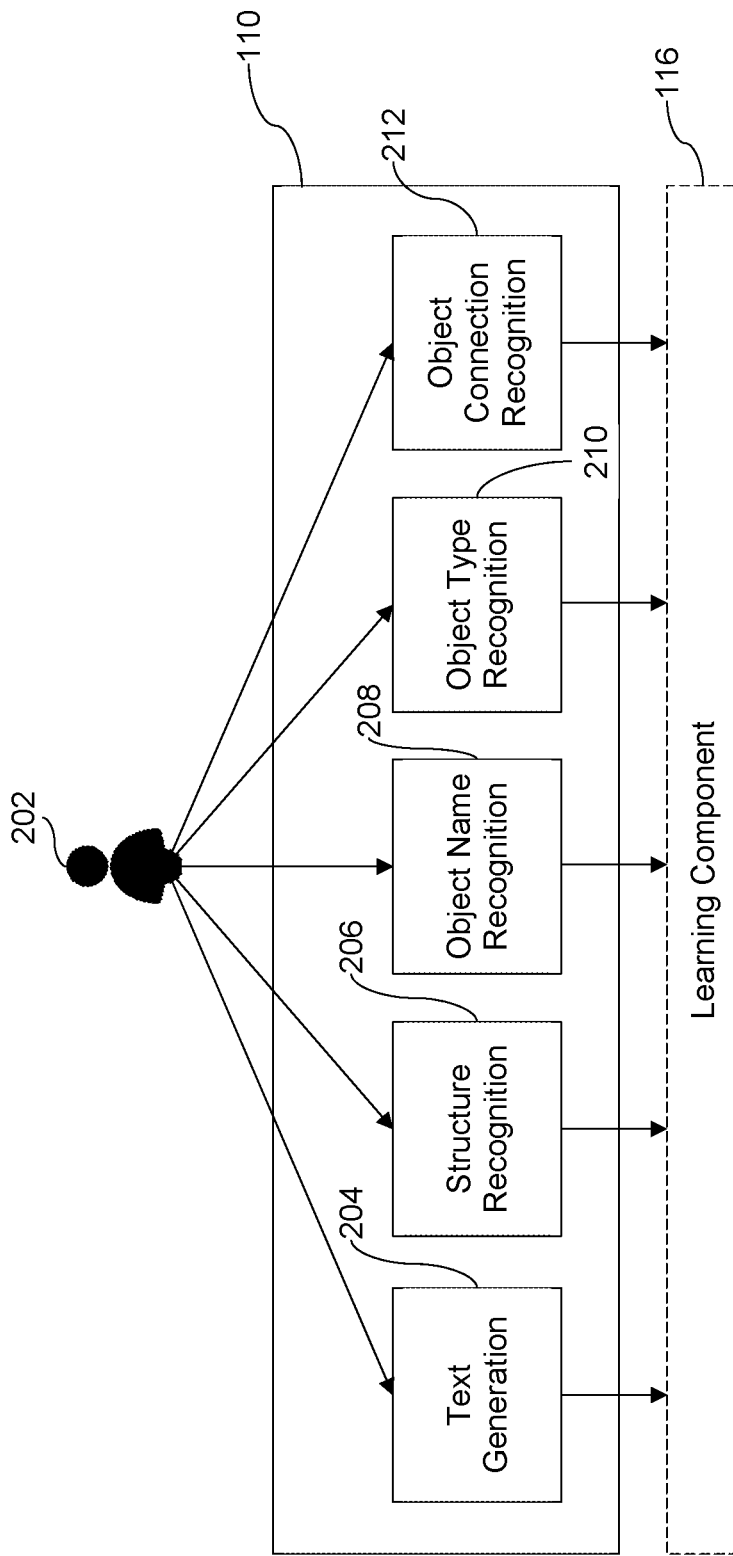
FIG. 2 is a block diagram showing how the user-interactive multi-level audio processing techniques of certain example embodiments may operate.

FIG. 2 is a block diagram showing how the user-interactive multi-level audio processing techniques of certain example embodiments may operate. FIG. 2 shows an authorized user 202 (who may be one of the participants 102a-102n in some instances) working with the multi-level audio processor 110 of FIG. 1. As alluded to above, the multi-level audio processor 110 is responsible for retrieving model-relevant information from the audio input 104. For early quality assurance and continuous learning purposes, it analyzes the audio input 104 in a stepwise manner and asks the user 202 for interim feedback. As shown in FIG. 2, there are five steps and thus at least five types of ways to iteratively improve the transformation, and the iterative improvement may be used in relation to any combination, sub-combination, or combination of sub-combinations of these steps. These give steps include text generation 204, structure recognition 206, object name recognition 208, object type recognition 210, and object connection recognition 212. Moreover, as will become clearer from the detailed description below, these steps are further decomposable into natural language processing operations including, for example, word recognition, sentence identification, word tagging, parsing, etc. These natural language processing operations, with or without the broader steps discussed above, also may be subjected to iterative improvement in any combination, sub-combination, or combination of sub-combinations.

Text generation 204 involves generating text from the received audio. This may be done in real time, batched for processing partially in real time, performed offline (e.g., after a meeting or the like), etc. The text generation 204 in certain example embodiments performs audio processing to generate text, and may reference the grammars to help improve its accuracy (e.g., by looking up words or phrases having low recognition accuracy, by cross-referencing words or phrases that are not common in general spoken language but might be relevant when defining a model generally or model specific to a domain), etc.

Structure recognition involves recognizing sentences, words, phrases, and/or the like. Such structures may be separated into meaningful or not meaningful categories (e.g., based on whether they include semantically-relevant concepts), based on context within the oral description, etc. This information is displayed graphically, and may be layered on top of a link enabling the audio to be played back at the relevant location (e.g., 1-2 seconds before and after the object) and presented to the user 202 for review (e.g., to correct placements, indicate that certain structures are missing or erroneously detected, etc.). The result is fed into the learning component 116 for further training related to the structure recognition.

Object name recognition involves identifying which structures are likely to be objects for inclusion in the model. The results are presented to the user 202, who may edit the strings if needed or desired. The result is fed into the learning component 116 for further training related to the textual recognition.

Object type recognition involves identification of the objects as being an item, decision, role, etc. The object types are determined and presented to the user 202, for possible additional editing (e.g., specifying different object types, correcting object type misidentifications, indicating that certain objects have been missed, etc.), e.g., in relation to the objects already displayed. Links enabling the user 202 to reference the source audio also may be provided. Again, the feedback is fed into the learning component 116 as input for further improvement.

Connection recognition may be based at least in part on the object types, and connections between objects may be typified and presented to the user 202, for possible additional editing (e.g., to refine connection types, to indicate that some connections were not identified or erroneously identified, etc.). The feedback contributes to the learning component 116 for further improvement.

An example use case will now be discussed in connection with the interactive workflow shown in FIG. 3, and the detailed workflow in FIG. 4 along with the code snippets, and example input and output, below. Although the process could begin with configuring modeling rules and/or grammars in step S302 and using the modeling rules configurator 126, in many instances, the grammars and transformation rules oftentimes will be predefined and will not need to be configured further. Instead, it may be possible to simply load the domain-related and/or model grammars appropriate for the task. A user may, for example, select the domain and the grammar may be loaded accordingly, e.g., as a part of step S402 and/or as a prerequisite to step S304.

In certain example embodiments, grammars may be defined as structured text or other documents (e.g., XML files, JSON files, and/or the like) stored to the model grammar store 112 and/or the domain grammar store 114. For instance, the domain grammar store 114 may store domain-specific keywords that are identified by a Subject Matter Expert (SME), according to an industry-standard taxonomy, and/or the like. Such grammars may be reusable across instances of the tool, and new or updated grammars may be added by simply adding them to the model grammar store 112 and/or the domain grammar store 114 and making them available for user selection. Thus, any domain can make use of the techniques of certain example embodiments by simply integrating its grammar in our solution.

The following is an example XML structure that may be used in connection with certain example embodiments. The grammar starts with a grammar tag, which includes a property called "id" that identifies the name of the domain. This identification property of the grammar tag helps define the current domain and may be presented to a user for selection. In this example, the domain is "BPM", which stands for business process management. There are two types of tags included in the grammar tag in this example, namely, a category tag and a keywords tag. The category tag stores possible step categories in the domain. Here, the categories are "service", "task", "rule", and "user task". The keywords tag includes the domain specific keywords, set off by entry tags and potentially word or phrase tags.

```
<grammar id="BPM">
    <category>service, task, rule, user task</category>
    <keywords>
        <entry>
            <word>step</word>
        </entry>
        <entry>
            <word>business</word>
        </entry>
        <entry>
            <word>process</word>
        </entry>
        ...
    </keywords>
</grammar>
```

The grammar can be extended or enriched in a number of ways. For example, it is possible to include tags and/or properties to indicate a part of speech for a word for potential disambiguation purposes (e.g., the "wound" could be identified as a noun or verb, depending on the context), synonyms, antonyms, etc. Information about who added an entry, when it was added, whether it is or will be deprecated, etc., may be included, as well. Pointers to a formal modeling convention (e.g., a BPMN, UML, or the like) may be provided, e.g., so that rules can be referenced and/or defined, indicating how the keyword should be represented in a resultant formalized model. The following example XML builds on the above example and includes additional tags for synonyms and antonyms, with each being provided in a comma-delimited fashion.

```
<grammar id="BPM">
    <category>service, task, rule, user task</category>
    <keywords>
        <entry>
            <word>step</word>
            <synonym>footprint,footstep</synonym>
            <antonym>stop</antonym>
        </entry>
        <entry>
            <word>business</word>
            <synonym>industry,interest,field,trade</synonym>
            <antonym>disservice</antonym>
        </entry>
        <entry>
            <word>process</word>
            <synonym>action,case,course,development</synonym>
            <antonym>cessation,decline</antonym>
        </entry>
        ...
    </keywords>
</grammar>
```

An internal master domain grammar may be created as a one-time task, or it may be provided in certain example embodiments, e.g., to further process the keywords and further enhance the grammar. In certain example embodiments, this enhanced grammar may include metadata for every given keyword. This structure helps the parsing (described in detail below) to be performed in an effective manner, even when considering word's synonyms and antonyms.

In certain example embodiments, the enhanced grammar may be regenerated, e.g., when an entry is added to, removed from, and/or modified within, the domain language grammar file, e.g., by a user or other authorized person. In some instances, the master file may be regenerated automatically, e.g., based on updates distributed by a SME, operator of the platform (e.g., to provide references to different formalized output models, to correct issues in conversion, etc.). In some instances, the master grammar will not be user-controlled and instead will be internal to the application.

The NLTK library may, for example, be used to facilitate grammar definition and enrichment in certain example embodiments. NLTK also may be used to assist in some or all of the operations shown in and described in connection with FIG. 4, for example. NLTK's Corpora database, or a variant thereof, may be used in some instances, e.g., in connection with grammar generation and/or regeneration. Although NLTK and Corpora are mentioned, it will be appreciated that there other libraries, tools, databases, and/or the like, may be used in different example embodiments.

The following is a further exampled example enhanced master domain grammar that may be generated:

```
<grammar id="BPM">
    <category>service, task, rule, user task</category>
    <keywords>
        <entry>
            <word>step</word>
            <synonym>footprint, footstep, stage, phase,
                operation, progression, stride, development, gait,
                stepover, period, point, stair </synonym>
            <antonym>stop, stopover, end </antonym>
        </entry>
        <entry>
            <word>business</word>
            <synonym>industry, affairs, interest, field, trade,
                subject, topic, commerce, pursuit, province,
                function, job, commercial, corporate, sector,
                organization </synonym>
            <antonym>disservice, non-act, inaction </antonym>
        </entry>
        <entry>
            <word>process</word>
            <synonym>action, case, course, development, means,
                work, procedure, method, route, way, manner,
                technique, system </synonym>
            <antonym> cessation, decline , inactivity, unusual
                </antonym>
        </entry>
        ...
    </keywords>
</grammar>
```

The following code snippet creates lists for synonyms and antonyms in connection with NLTK's wordnet.synsets( ) method.

```
SYN, ANT = [ ], [ ]
//run synsets( ) for word - process
for syn in wordnet.synsets("process"):
    // loop through all the lemmas in the sysnets( ) output
    for l in syn.lemmas( ):
        //l.name( ) gives synonyms to be stored in list SYN
        SYN.append(l.name( ))
        //l.antonyms( ) gives antonyms to be stored in list ANT
        ANT.append(l.antonyms( ) [0].name( ))
```

If an SME provides the optional synonym and/or antonym fields in the domain grammar, certain example embodiments may learn the associated synonyms and/or antonyms for the domain and update the internal grammar file accordingly.

In certain example embodiments, this master internal grammar file is not user customizable. Instead, if user wishes to add, remove, or change a keyword, the user can update the actual grammar file from which it is generated. If a change is detected in the domain grammar, the internal grammar may be regenerated automatically.

Figure 3:
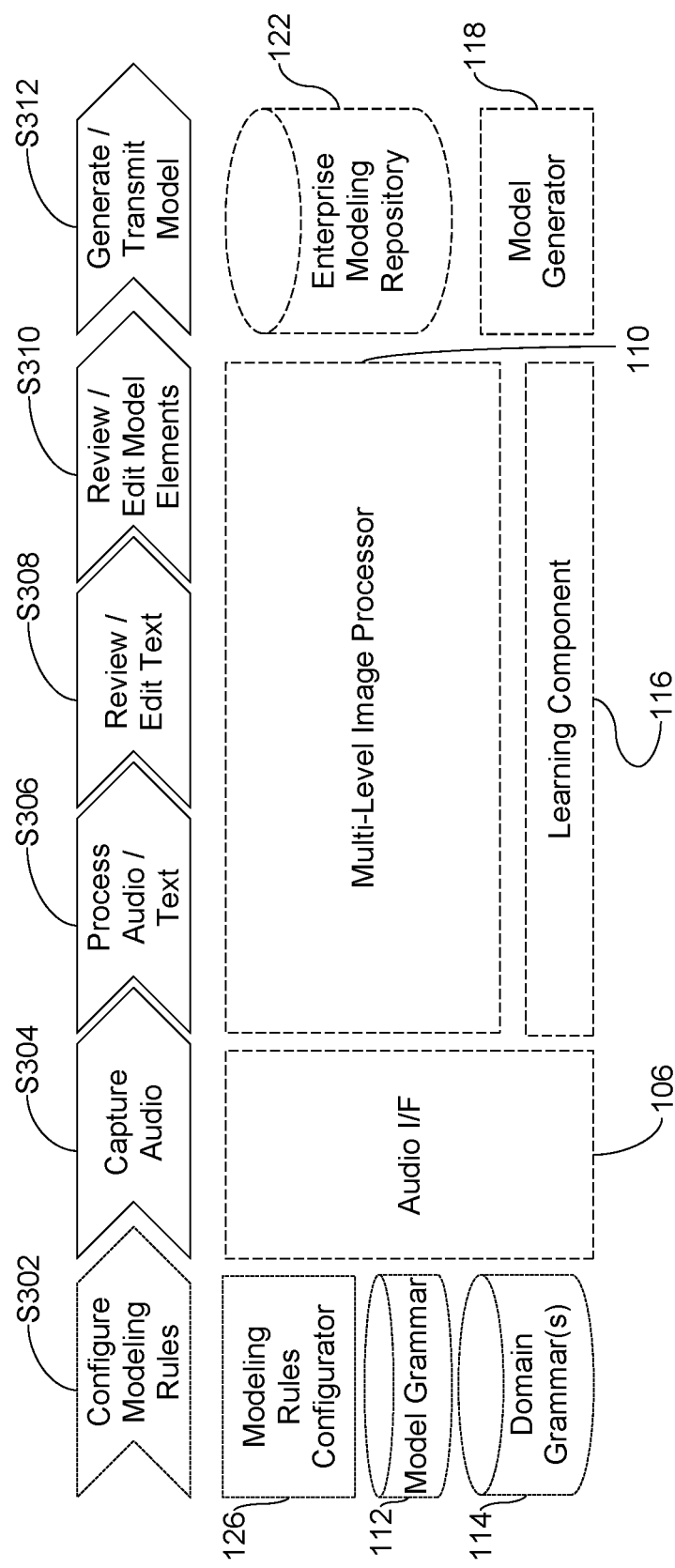
FIG. 3 is an example workflow, which may be used in connection with certain example embodiments.
Figure 4:
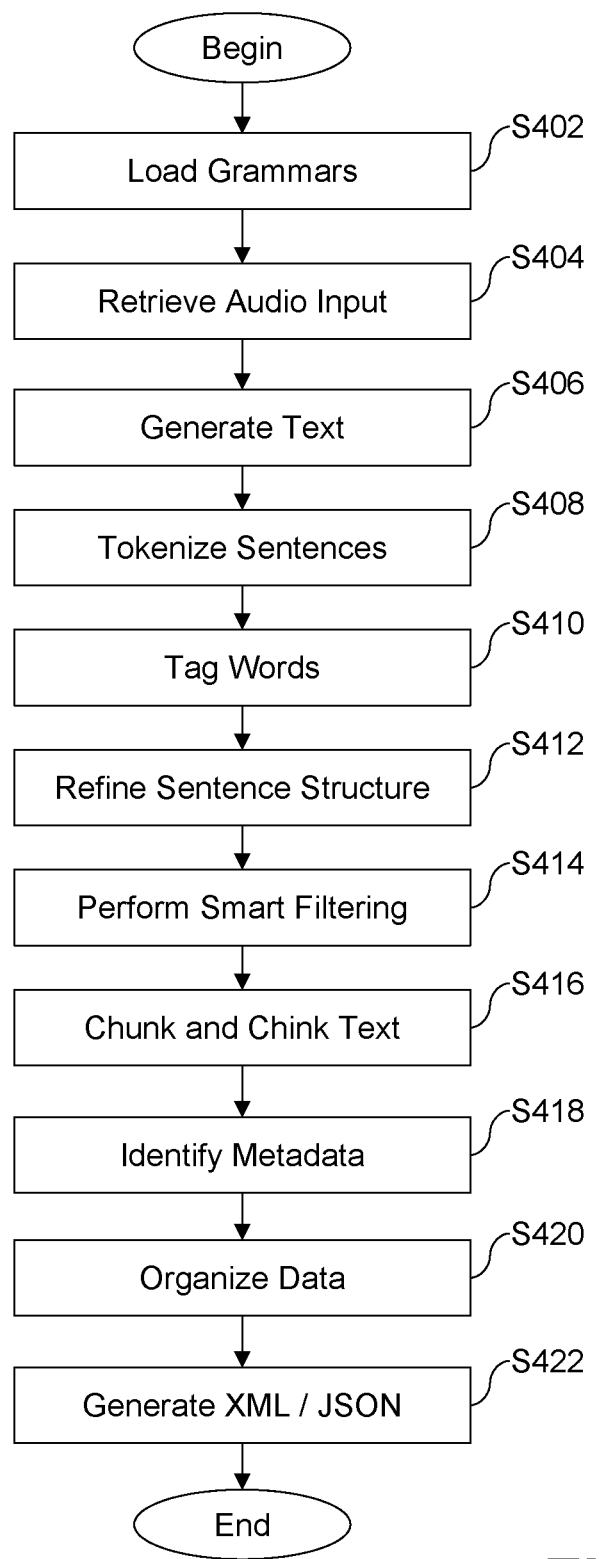
FIG. 4 is an example flowchart, showing in detail how an oral description provided in natural language can be converted into an enterprise model represented in a formalized modeling language, in accordance with certain example embodiments.

Assuming that the grammar is built and loaded, the example use case continues with step S304 in FIG. 3 and step S404 in FIG. 4, in which audio is captured and/or retrieved. The user opens the application on the host device, and audio is captured via the microphone, loading a file that has been recorded, playing a prerecorded session, etc.

The audio input can be a collection of spoken words that form one or more sentences. For the purposes of illustration, consider the following example text that is generated in step S406 from audio received in step S304 in FIG. 3 and step S404:

Hello, Good Morning. We are from ABC organization looking to automate our sector flow. Our business model has 2 steps. It will begin with a business case called MyCase. The first step should have a service called Data Extractor and the second step should have a user task named Validate. Thank you for your attention.

The text is processed in step S306, which may include a plurality of operations included in FIG. 4. For example, sentence tokenization, also sometimes referred to as sentence boundary disambiguation, is performed on this text in step S408. Sentence tokenization in essence splits the paragraph into multiple sentences. Given the input pattern above, tokens corresponding to the bullet points below may be generated:

Hello, Good Morning.
We are from ABC organization looking to automate our sector flow.
Our business model has 2 steps.
It will begin with a business case called MyCase.
The first step should have a service called Data Extractor and the second step should have a user task named Validate.
Thank you for your attention.

Although certain example embodiments discuss the concept of splitting the audio into discrete sentences or the like, it will be appreciated that this may be a multi-step operation. For instance, in certain example embodiments, the audio may be first converted into text, and then the text may be split into discrete sentences. An optional correction operation may be interposed between the conversion from audio to text, e.g., so that the user has an opportunity to improve the accuracy of the speech recognition or the like. In certain example embodiments, an optional correction step may be applied after the splitting into discrete sentences, e.g., to address the accuracy of splits and/or the underlying text. It will be appreciated that references to splitting the audio into discrete sentences and the like include intermediary and/or other related processing steps (such as, for example, the intermediary conversion into text in at least some instances).

Tagging involves associated each word with a valid part of speech. In step S410, each word is tagged with a valid part of speech. The following table lists example parts of speech that may be used in certain example embodiments.

| Tag Abbreviation | Full Form |
| --- | --- |
| CC | Coordinating conjunction |
| CD | Cardinal number |
| DT | Determiner |
| EX | Existential there |
| FW | Foreign word |
| IN | Preposition or |
| JJ | Adjective |
| JJR | Adjective, comparative |
| JJS | Adjective, superlative |
| LS | List item marker |
| MD | Modal |
| NN | Noun, singular or mass |
| NNS | Noun, plural |
| NNP | Proper noun, singular |
| NNPS | Proper noun, plural |
| PDT | Predeterminer |
| POS | Possessive ending |
| PRP | Personal pronoun |
| PRP$ | Possessive pronoun |
| RB | Adverb |
| RBR | Adverb, comparative |
| RBS | Adverb, superlative |
| RP | Particle |
| SYM | Symbol |
| TO | to |
| UH | Interjection |
| VB | Verb, base form |
| VBD | Verb, past tense |
| VBG | Verb, gerund or present participle |
| VBN | Verb, past participle |
| VBP | Verb, non-3rd person singular present |
| VBZ | Verb, 3rd person singular present |
| WDT | Wh-determiner (includes "what" and/or "which" provided that they do not occur at the beginning of a sentence) |
| WP | Wh-pronoun (includes "who", "whether", and/or "what", indicating a "selection between something") |
| WP$ | Possessive wh-pronoun |
| WRB | Wh-adverb (includes "how", "when", "whence", "where", and/or "why", thereby indicating something interrogative) |

Given the sentence "The first step should have a service called Data Extractor" from the example above, the output will be as follows:

```
[('The', 'DT'), ('first', 'JJ'), ('step', 'NN'),
('should', 'MD'), ('have', 'VB'), ('a', 'DT'),
('service', 'NN'), ('called', 'VBN'), ('Data',
'NNP'), ('Extractor', 'NNP')]
```

As will be appreciated from this example, a list of lists may be generated, with each internal list being an individual sentence. Each individual sentence may include a plurality of tuples, for example, identifying the word and the part of speech. It will be appreciated that different data structures may be used in different example embodiments.

To help improve the quality of tokenization and provide for better recognition of discrete concepts that may need to be included in the model, conventional sentence tokenization algorithms (such as those provided by NLTK, for example) may be enhanced to further tokenize the given sentences based on coordinating conjunction (CC), subordinating conjunction (IN), and/or adverb (WRB) presence. In essence, this operation involves a conversion to more "meaningful sentences" by further examining the sentences to determine whether they can be bifurcated into smaller logical sentences. In this sense, the sentence structure is refined, as indicated in step S412.

In the example above, the sentence "The first step should have a service called Data Extractor and the second step should have a user task named Validate" will be split into two parts as a result of the refining. The first sentence will be "The first step should have a service called Data Extractor.", and the second sentence will be "The second step should have a user task named Validate." This is because the word "and" is tagged with the "CC" (coordinating conjunction) tag in step S410. Thus, the compound sentence is bifurcated into two parts. Pseudo-code for accomplishing this operation is as follows:

```
if pos is ("CC" or "IN" or "WRB")
    Split sentence based on pos location
Else
    Do nothing.
```

Smart filtering is performed in step S414. This step references the user-selected grammar(s) to check each sentence for context relevance. Those sentences that contain at least one domain keyword are stored for further processing, and the remaining sentences are discarded.

Keeping with the example text above, the following example shows the first and last tokenized sentences being removed for lacking context relevance. At least the bolded text is assumed to be present in the grammar, thereby confirming the context relevance.

- ~~Hello, Good Morning.~~
- We are from ABC organization looking to automate our sector flow.
- Our business model has 2 steps.
- It will begin with a business case called MyCase.
- The first step should have a service called Data Extractor
- the second step should have a user task named Validate.
- ~~Thank you for your attention.~~

As can be seen in this example, the seven input lines are filtered based on the keywords from the internal grammar, and five lines are stored for further processing. The following code may be used to perform this functionality:

```
grammar_words = [ ] // stores the words after parsing the
                    // internal grammar file
// store sentence after extended tokenization
all_sentence = [ ]
valid_sentence = [ ]   // will store the valid sentences
//loop through each sentence in all_sentence
for each my_sentence in all_sentence:
    words = nltk.word_tokenize(my_sentence) //tokenizing words
    //loop through each word in variable words
    for each word in words:
        if word in grammar_words:
            //mark sentence as valid and store in valid_sentence
            valid_senetence.append(my_sentence)
```

Once the sentences that are likely to be context relevant are identified, filtering may be performed, e.g., to further identify potentially semantically important concepts in the sentences. Positive and/or negative filters may be used in different example embodiments. For instance, chunking and chinking are example positive and negative filter approaches that may be used alone and/or in combination. Chunking and chinking are similar to each other, at least at some conceptual level. For example, both chunking and chinking act on the tagged data to create a group (or chunk) of tags based on input to a regular expression (a regex filter). This regex filter is based on the part-of-speech element in the example tuple discussed above. In certain example embodiments, chunking may be performed prior to chinking, or this order may be reversed in different example embodiments. In certain example embodiments, multiple positive filters may be applied, followed by multiple negative filters; in different example embodiments, multiple negative filters may be applied, followed by multiple positive filters; and in still other example embodiments, positive and negative filtered may be applied and interleaved with one another.

As indicated above, chunking is a positive filter. The result of chunking will be the tags that are mentioned in this example regex filter:

Chunk: {<RB.?>*<VB.?>*<NNP>+<NN>?}

This chunking regex is responsible for getting words containing an adverb or verb followed by a plural noun and a noun. Thus, the following output may be based on the following input, which corresponds to the sentence "The first step should have a service called Data Extractor":

Input: [('The', 'DT'), ('first', 'JJ'), ('step', 'NN'), ('should', 'MD'), ('have', 'VB'), ('a', 'DT'), ('service', 'NN'), ('called', 'VBN'), ('Data', 'NNP'), ('Extractor', 'NNP')]
Output: (S
The/DT
first/JJ
step/NN
should/MD
have/VB
a/DT
service/NN
(Chunk called/VBN Data/NNP Extractor/NNP))

The following sample code may be used in this regard:
chunk=r"""chunk: {<RB.?>*<VB.?>*<NNP>+<NN>?}"""
words=nitk.word_tokenize(sentence)
tagged data=nitk.pos_tag(words)
valid_chunks=nitk.RegexpParser(chunk).parse(tagged_data)

As shown above, a chunk variable is created and, in this example, it includes the accepted tags in regex format. After a sentence is tagged, the tagged information is process using the nitk.RegexParser( ) method, and the valid chunks are stored in the variable valid_chunks. It is noted that the chunk process is used multiple times, e.g., with different regex combinations.

Another example chunk regex can involve retrieving the sequence number of the object. The following same code may be used in this regard:
object_sequence:{<JJ.*><NN.*>}

Here, the expected word is an adjective, followed by a noun. It will be appreciated that different regex code may be manually created based on the domain, for example. However, in certain example embodiments, it may be possible to generate regex code automatically, e.g., based on learned behavior (e.g., observations of how a human operator chunks and/or chunks tagged text in a training set, corrects already chunked and/or chinked text, etc.).

Unlike chunking, chinking is a negative filter. The result of chinking will be tagged words that are not present in the regex filter. An example chinking regex that is responsible for creating a group of all words excluding verb, preposition, determinant, etc., words is as follows:

```
Chink: {<.*>+}
      }<VB.?|DT|PRP>+{
```

Applying chinking to the same sentence will generate the following output based on the following input:

Input: [('The', 'DT'), ('first', 'JJ'), ('step', 'NN'), ('should', 'MD'), ('have', 'VB'), ('a', 'DT'), ('service', 'NN'), ('called', 'VBN'), ('Data', 'NNP'), ('Extractor', 'NNP')]
Output: (S
The/DT
(Chink first/JJ step/NN should/MD)
have/VB
a/DT
Chink service/NN)
called/VBN
(Chink Data/NNP Extractor/NNP))

The following sample code may be used in this regard. It will be appreciated that the chinking operation is similar to chunking, except that a chink variable is used. In the example above, three chunks are generated, but none of them contains the specified tags as determined by the chinking.

```
chink = r"""chink:{<.*>+}
           }<VB.?|DT|PRP>+{"""
words = nltk.word_tokenize(sentence)
tagged_data = nltk.pos_tag(words)
valid_chunks = nltk.RegexpParser(chink).parse(tagged_data)
```

Metadata is identified in step S418. One type of metadata that may be identified relates to or ordering. In certain example embodiments, a number or ordering provided in a sentence, explicitly or implicitly, may be detected. This number or ordering may provide information about the position of the step, the total number of steps in the complete user conversation, etc. A cardinal number may be represented in a general form of a tag, together with other common tags such as those indicative of parts of speech, e.g., as further explained below.

In a normal human conversation, positional information can be in the form of cardinal number, adjective, or adverb. Consider the following examples:

"Step 1": Here, "1" is a cardinal number indicative of the positional information.

"First Step": Here, "first" is positional information in adjective form.

"First we want . . . ": Here, "first" is positional information in adverb form.

Detection may be facilitated using parts of speech and by using the Cardinal Number (CD), Adjective (JJ), and Adverb (RB) tags. The following chunking regex can be used in this regard:

Chunk: {<CD|JJ|RB>}

Example input and output is shown below.
Input: The first step should have a service called Data Extractor
Output: [0]:('The', 'DT')
[1]:Tree('chunk', [('first', 'JJ')])
[2]:('step', 'NN')
[3]:('should', 'MD')
[4]:('have', 'VB')
[5]:('a', 'DT')
[6]:('service', 'NN')
[7]:('called', 'VBN')
[8]:('Data', 'NNP')
[9]:('Extractor', 'NNP')

As seen here the word first is detected as a "JJ" (adjective) chunk. If the chunk is a "CD" chunk (Cardinal Number) like 2, 3, etc., it is stored in the same form as a number. Otherwise, if the chunk is of type "JJ", it is converted to a numeral. For example, "first" and "second" will be converted to 1 and 2, respectively, and the corresponding cardinal number will be stored. In the above example, the detected cardinal number is 1. The first tuple above is further augmented so that the corresponding cardinal number metadata is reflected therein.

Further metadata identification may include step type and name related operations. The detection of type and name can be achieved by chunking with a valid regex, by performing regex comparisons on the generated parts of speech output, and/or the like, in certain example embodiments. The corresponding regular expressions may be hardcoded in certain example embodiments, e.g., to provide for more grammar-independent functionality. It will be appreciated, however, that hardcoding need not be practiced completely or at all, as hardcoding can reduce flexibility in some instances.

The following regular expression may be used to detect type and name in certain example embodiments:
Example regex: ^[N]+V[A-Z]+NN[A-Z][A-Z]*
Input: The first step should have a service called Data Extractor
Parts of Speech Output: [('The', 'DT'), ('first', 'JJ'), ('step', 'NN'), ('should', 'MD'), ('have', 'VB'), ('a', 'DT'), ('service', 'NN'), ('called', 'VBN'), ('Data', 'NNP'), ('Extractor', 'NNP')]
After Regex Filter: service called Data Extractor
Detected Output: name=Data Extractor; type=service
Grammar filter result: valid As shown in the above regex string, the search criteria includes a valid combination of noun, followed by a verb and multiple nouns. First, the input sentence is tagged for parts of speech, then the regex filter is applied, providing the output "service called Data Extractor".

After this stage, the step name and type is detected based on the NN (noun) and VB (verb) position. Text before the VB (verb) will be the step type, and the text after the VB (verb) will be the step name.

Once the step metadata is detected, it is validated with the domain grammar. The detected step type is compared with the categories provided in the domain grammar. If the detected step metadata is found to be valid, it is stored along with its cardinal number. On the other hand, certain sentences (such as, for example, the ones shown below) will be discarded automatically, based on regex validation.
We are from ABC organization looking to automate our sector flow
Our business model has 2 steps.

Similarly, the following sentence is discarded based on the domain grammar validation:
It will begin with a business case called MyCase.

The data is further organized in step S420, e.g., based on the cardinal number detection described above. In certain example embodiments, whenever a step is processed, it is awarded a number as per the example description above. The metadata for the step may be processed to organize the steps accordingly. The following code may be used in this regard:

```
1. //the variable valid_sentence contains all the valid
sentences after processing, as each sentence is stored its
index acts as the default position
    valid_sentence = [ ]
    step_details = [ ]
    //loop through each sentence in valid_sentence
    for each my_sentence in valid_sentence:
        //the positional information is stored in step_number
        //the step metadata is stored in step_data
        // the information is stored in step_details at the
        //position step_number
        step_details.insert(step_number, step_data)
```

As indicated above, user-interactive review of the process may be interposed at any position(s) in these processes. Referring to FIG. 3, for example, the user may be able to review or edit the text that is recognized in step S308, review and/or edit model elements in step S310, etc. Although not shown expressly in FIG. 3 or FIG. 4, the output form the tokenizing, tagging, refining, smart filtering, chunking/chinking, metadata identification, organizing, etc., may be iteratively reviewed in a user-interactive manner. For example, level-by-level review of elements may be performed, e.g., such that candidate model objects are reviewed first and as a batch, types are reviewed next, ordering is subsequently reviewed, and connections are reviewed last. This level-by-level check also includes the more granular audio processing techniques described in connection with steps S406 to S420 in FIG. 4.

Thus, the user has a chance to review the recognized structures. Retrieved and computed structural information may be displayed on a level-by-level basis. If the user indicates that some structural information is missing, the user may directly annotate the markup, indicating that a recognized structure should not be present, define boundaries and/or other type information for an initially unrecognized structure, etc. Alternatively, or in addition, the user may replay or re-provide at least a portion of audio for analysis. The user therefore is able to review and edit if necessary or desirable recognized object names, types, and connections.

It will be appreciated that information resulting from the steps (including corrections, implicit or explicit confirmation of accuracy of object and/or voice recognition, etc.) may be fed to the learning component 116, e.g., to help improve accuracy for future uses.

Referring once again to FIG. 3, the model is generated in step S312 and in connection with the model generator 118. It is also transmitted to the enterprise modeling repository 122. This may include generation of XML, JSON, or other structured files, e.g., in accordance with a user selected model format such as, for example, BPMN 2.0, UML, ARTS, etc. Rules for transforming different objects may be embedded in the grammars and/or elsewhere. Decoupling the rules from the grammars may be advantageous in certain example embodiments, e.g., by potentially allowing for new languages to be developed and plugged in to the generic framework. To facilitate this functionality, the grammars may store a first set of mappings or rules to an application-specific format, and the model generator may read out and apply a set of mappings or rules from the application-specific format to the end-target format. This latter set of mappings or rules may be customized and extended over time to support new formalized modeling languages, update old ones, etc.

The following is an example of a generic XML output that may be generated in certain example embodiments. This generic format may be parsed using domain-specific parsers for creating a specific integrated development environment (IDE) input file.

```
<root>
    <branches>
        <branch>
            <node>
                <order>0</order>
                <type>service</type>
                <name>Data Extractor</name>
            </node>
            <node>
                <order>1</order>
                <type>user task</type>
                <name>Validate</name>
            </node>
        </branch>
    </branches>
</root>
```

Step S312 thus is practiced in connection with the model generator 118 and the enterprise modeling repository 122. The user may choose a target model from the models stored in enterprise repository 122 in order to define the position in the overall enterprise architecture as maintained in ARTS or the like. The user may also specify that a new model should be created. Once a target is specified, the structured file is generated and transmitted to the repository adapter.

In certain example embodiments, deployment of the generated model may be performed to cause physical elements of a real-world analog of the thus-generated computerized model to behave differently compared to a pre-deployment scenario, to cause computer-based resources of a real-world analog of the computerized model to interact with each other differently compared to a pre-deployment scenario, etc. For example, an online order processing system may be made to process orders in a new and improved way, a physical manufacturing process for an automobile or glass may be altered so that robots function in different ways, sensors may be made to gather different data, data processing operations in a server farm or cloud environment may be altered, etc.

Certain example embodiments may use additional technology to further improve the accuracy of the speech recognition and/or model creation. For example, only certain members of a meeting, conference call, or the like may be authorized to provide input for the model. Certain example embodiments thereby may isolate the audio coming from those speakers and process only it. This may be accomplished in some circumstances by in effect muting the lines of other callers on a conference call during a live or real-time implementation. That is, the audio to be captured and processed may come from only one input line, microphone, telephone connection, or the like. If there is offline processing in such circumstances, different audio files may be captured for different users, and only the one or ones associated with authorized personnel may be processed offline for model generation purposes. In this regard, different audio files may be associated with different speakers, e.g., through a file naming convention, appending of metadata, and/or the like. It is known, for example, for online conference call systems to identify speakers, e.g., in connection with SIP processing, and this technology may be leveraged in certain example embodiments. As another example, in a conference room where there are multiple parties potentially providing input to a single microphone or the like, a camera in the room may focus on the speaker. Thus, when audio is lined up with detected movement of the authorized speaker's face, audio may be processed. This approach is suited for both real time and offline processing. Of course, it will be appreciated that other approaches may be taken in these and/or other regards.

Although certain example embodiments have been described in connection with enterprise model and certain example software systems, it will be appreciated that the technology disclosed herein may be used in connection with any modeling platform.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for creating a computerized model usable in connection with an enterprise modeling platform, the computerized model being defined in connection with a formalized modeling language, the system comprising:
    an audio input interface;
    a display device; and
    processing resources including at least one processor and a memory operably coupled thereto, the processing resources being configured to control the system to at least:
        receive, over the audio input interface, audio input of an orally-described model from which the computerized model is to be created, the orally-described model having semantic concepts associable with the formalized modeling language but following a natural language pattern rather than an input pattern expected by the formalized modeling language;
        recognize the semantic concepts included in the orally-described model, the recognizing including a plurality of different identification levels, the different identification levels respectively corresponding to recognitions of semantic concepts in the orally-described model including (a) objects for inclusion in the computerized model, (b) object types for the recognized objects, and (c) connections between at least some of the recognized objects, wherein at least some of the semantic concepts are recognizable from a domain-specific grammar that includes possible semantic concepts that are arranged hierarchically and associated with a domain to which the computerized model being created belongs, and wherein at least some others of the semantic concepts are recognizable from a general grammar that includes other possible semantic concepts that are relevant to the computerized model and that are arranged hierarchically but that are domain-independent;

generate a digitized iteratively-reviewed version of the orally-described model by:
  presenting, on the display device and on an identification level by identification level basis, results of the recognitions corresponding to at least some of the respective identification levels, and
  accepting user modification(s) to the results on the identification level by identification level basis; and
transform the digitized iteratively-reviewed version of the orally-described model into the computerized model in accordance with a set of rules defining relationships between elements in the digitized iteratively-reviewed version of the orally-described model and the formalized modeling language.

2. The system of claim 1, wherein the processing resources are configured to control the system to at least, as a part of the recognizing:
  split the audio input into discrete sentences;
  identify and tag each word in each discrete sentence with a part of speech corresponding to a way in which it is used in the natural language pattern that the orally-described model follows;
  for each discrete sentence, and based on the tags, group together syntactically correlated words into one or more phrases;
  separate each discrete sentence into one or more meaningful parts;
  identify as context-relevant each meaningful part that includes (a) a phrase and/or (b) a word that is not a part of a phrase, that correspond(s) to a semantic concept found in the domain-specific grammar and/or the general grammar; and
  for each identified context-relevant meaningful part, create a candidate object for inclusion in the computerized model, each created candidate object having associated therewith system-derived properties including a proposed order, proposed name, and proposed type,
  wherein the created candidate objects are user-reviewable in connection with the generation of the digitized iteratively-reviewed version of the orally-described model.

3. The system of claim 2, wherein the grouping involving at least two different phases, at least one of the phases involving implementation of a positive filter for grouping together different words and at least one other of the phases involving implementation of a negative filter for discarding words.

4. The system of claim 3, wherein a first phase is chunking and a second phase is chinking, and the first and second phases are performed in this order.

5. The system of claim 2, wherein the processing resources are configured to control the system to at least facilitate interactive step-wise user review by displaying, receiving user confirmation of, and enabling user modification(s) to, results generated responsive to one or more of: the splitting of the audio input into the discrete sentences, the separation of each discrete sentence into the one or more meaningful parts, the identification of each context-relevant meaningful part, the creation of each candidate object, and identification of the system-derived properties.

6. The system of claim 2, wherein the identification levels further include results generated responsive to the splitting of the audio input into the discrete sentences, the separation of each discrete sentence into the one or more meaningful parts, the identification of each context-relevant meaningful part, the creation of each candidate object, and identification of the system-derived properties.

7. The system of claim 1, wherein the processing resources are configured to control the system to at least, as a part of the recognizing, group together syntactically correlated words, from the audio input, into one or more phrases, the grouping involving at least two different phases, at least one of the phases being a positive filter for grouping together different words and at least one other of the phases being a negative filter for discarding words, wherein a first phase is chunking and a second phase is chinking, and the first and second phases are performed in this order.

8. The system of claim 1, wherein the processing resources are configured to control the system to at least, as a part of the recognizing, identify, as context-relevant, different parts of different identified discrete sentences from the audio input that respectively include (a) a phrase and/or (b) a word that is not a part of a phrase, that correspond(s) to a semantic concept found in the domain-specific grammar and/or the general grammar.

9. The system of claim 1, wherein the processing resources are configured to control the system to at least deploy the computerized model, once transformed from the digitized iteratively-reviewed version of the orally-described model, to the enterprise modeling platform.

10. The system of claim 9, wherein the deployment is performed to cause physical elements of a real-world analog of the computerized model to behave differently, compared to a pre-deployment scenario.

11. The system of claim 9, wherein the deployment is performed to cause computer-based resources of a real-world analog of the computerized model to interact with each other differently, compared to a pre-deployment scenario.

12. A method of creating a computerized model usable in connection with a modeling platform, the computerized model being defined in connection with a formalized modeling language, the method comprising:
  receiving, over an audio input interface, audio input of an orally-described model from which the computerized model is to be created, the orally-described model having semantic concepts associable with the formalized modeling language but following a natural language pattern rather than an input pattern expected by the formalized modeling language;
  recognizing, using processing resources including at least one processor and a memory operably coupled thereto, the semantic concepts included in the orally-described model, the recognizing including a plurality of different identification levels, the different identification levels respectively corresponding to recognitions of semantic concepts in the orally-described model including (a) objects for inclusion in the computerized model, (b) object types for the recognized objects, and (c) connections between at least some of the recognized objects, wherein at least some of the semantic concepts are recognizable from a domain-specific grammar that includes possible semantic concepts that are arranged hierarchically and associated with a domain to which the computerized model being created belongs, and wherein at least some others of the semantic concepts are recognizable from a general grammar that includes other possible semantic concepts that are relevant to the computerized model and that are arranged hierarchically but that are domain-independent;
  generating a digitized iteratively-reviewed version of the orally-described model by:

presenting, on a display device and on an identification level by identification level basis, results of the recognitions corresponding to at least some of the respective identification levels, and accepting user modification(s) to the results on the identification level by identification level basis; and transforming the digitized iteratively-reviewed version of the orally-described model into the computerized model in accordance with a set of rules defining relationships between elements in the digitized iteratively-reviewed version of the orally-described model and the formalized modeling language.

13. The method of claim 12, further comprising:

splitting the audio input into discrete sentences;

identifying and tagging each word in each discrete sentence with a part of speech corresponding to a way in which it is used in the natural language pattern that the orally-described model follows;

for each discrete sentence, and based on the tags, grouping together syntactically correlated words into one or more phrases;

separating each discrete sentence into one or more meaningful parts;

identifying as context-relevant each meaningful part that includes (a) a phrase and/or (b) a word that is not a part of a phrase, that correspond(s) to a semantic concept found in the domain-specific grammar and/or the general grammar; and for each identified context-relevant meaningful part, creating a candidate object for inclusion in the computerized model, each created candidate object having associated therewith system-derived properties including a proposed order, proposed name, and proposed type.

14. The method of claim 13, further comprising facilitating interactive step-wise user review by displaying, receiving user confirmation of, and enabling user modification(s) to, results generated responsive to one or more of: the splitting of the audio input into the discrete sentences, the separation of each discrete sentence into the one or more meaningful parts, the identification of each context-relevant meaningful part, the creation of each candidate object, and identification of the system-derived properties.

15. The method of claim 13, wherein the identification levels further include results generated responsive to the splitting of the audio input into the discrete sentences, the separation of each discrete sentence into the one or more meaningful parts, the identification of each context-relevant meaningful part, the creation of each candidate object, and identification of the system-derived properties.

16. The method of claim 12, further comprising grouping together syntactically correlated words, from the audio input, into one or more phrases, the grouping involving at least two different phases, at least one of the phases being a positive filter for grouping together different words and at least one other of the phases being a negative filter for discarding words, wherein a first phase is chunking and a second phase is chinking, and the first and second phases are performed in this order.

17. The method of claim 12, further comprising identifying, as context-relevant, different parts of different identified discrete sentences from the audio input that respectively include (a) a phrase and/or (b) a word that is not a part of a phrase, that correspond(s) to a semantic concept found in the domain-specific grammar and/or the general grammar.

18. A non-transitory computer-readable storage medium tangibly storing a program for creating a computerized model usable in connection with an enterprise modeling platform, the computerized model being defined in connection with a formalized modeling language, the program being executable on a computing system comprising an audio input interface, a display device, and processing resources including at least one processor and a memory operably coupled thereto, wherein the program is executable to perform functionality comprising:

receiving, over the audio input interface, audio input of an orally-described model from which the computerized model is to be created, the orally-described model having semantic concepts associable with the formalized modeling language but following a natural language pattern rather than an input pattern expected by the formalized modeling language;

recognizing, using processing resources including at least one processor and a memory operably coupled thereto, the semantic concepts included in the orally-described model, the recognizing including a plurality of different identification levels, the different identification levels respectively corresponding to recognitions of semantic concepts in the orally-described model including (a) objects for inclusion in the computerized model, (b) object types for the recognized objects, and (c) connections between at least some of the recognized objects, wherein at least some of the semantic concepts are recognizable from a domain-specific grammar that includes possible semantic concepts that are arranged hierarchically and associated with a domain to which the computerized model being created belongs, and wherein at least some others of the semantic concepts are recognizable from a general grammar that includes other possible semantic concepts that are relevant to the computerized model and that are arranged hierarchically but that are domain-independent;

generating a digitized iteratively-reviewed version of the orally-described model by:

presenting, on the display device and on an identification level by identification level basis, results of the recognitions corresponding to at least some of the respective identification levels, and accepting user modification(s) to the results on the identification level by identification level basis; and transforming the digitized iteratively-reviewed version of the orally-described model into the computerized model in accordance with a set of rules defining relationships between elements in the digitized iteratively-reviewed version of the orally-described model and the formalized modeling language.

19. The non-transitory computer-readable storage medium of claim 18, wherein the program is executable to perform further functionality comprising grouping together syntactically correlated words, from the audio input, into one or more phrases, the grouping involving at least two different phases, at least one of the phases being a positive filter for grouping together different words and at least one other of the phases being a negative filter for discarding words, wherein a first phase is chunking and a second phase is chinking, and the first and second phases are performed in this order.

20. The non-transitory computer-readable storage medium of claim 18, wherein the program is executable to perform further functionality comprising identifying, as context-relevant, different parts of different identified discrete sentences from the audio input that respectively include (a) a phrase and/or (b) a word that is not a part of a phrase, that correspond(s) to a semantic concept found in the domain-specific grammar and/or the general grammar.

* * * * *